United States Patent Office 2,987,436
Patented June 6, 1961

2,987,436
PARA-CHLOROAZOXYBENZENE PESTICIDE
Robert J. Geary, Vero Beach, Fla., assignor to Plant Products Corporation, Blue Point, N.Y.
No Drawing. Filed Feb. 24, 1958, Ser. No. 716,855
9 Claims. (Cl. 167—30)

This invention relates to the production of a new pesticidal composition and more particularly to insecticidal, particularly miticidal, compositions containing para-chloroazoxybenzene.

It is well known that there are several excellent pest control materials available today, including for example DDT, which are highly effective against a large variety of insects and other pests. While these and other similar insecticides are very powerful, they are by no means perfect since their action is specific to certain pests and of no effect whatsoever on others. Because of this, the use of DDT under certain circumstances may do little or no good and may, in fact, do harm, being ineffective against mites, although highly effective in killing various types of pests in addition to predators such as honeybees, ladybird beetles and certain other insects which control and kill mites. As a specific example, apple trees are commonly infested by coddling moths and red mites. While the red mites are more or less controlled by ladybird beetles and other predaceous and parasitic insects, they are not controlled by DDT. The DDT accordingly destroys the coddling moth but at the same time destroys the beneficial ladybird beetles with the result that the red mite population increases to such an extent that it may do as much or more harm than was previously caused by the coddling moth.

It is also well known that certain compounds have been previously proposed as miticides which may be applied admixed with DDT and similar insecticides. However, such miticides have proved effective only for a certain initial period of time, after which the mites appeared to develop strains which are resistant to the action thereof. Such resistant mites have caused a great deal of trouble in being resistant to most known miticides and mixtures thereof with other insecticides.

It is an object of this invention to provide a new and improved pesticidal composition. Another object of this invention is the provision of a composition which will be highly effective as a miticide. Still another object of this invention is the provision of a composition which is highly effective against resistant mites. Other objects and advantages of the invention will appear as the description proceeds.

The attainment of the above objects is made possible by my discovery that para-chloroazoxybenzene is highly effective as a miticide. This compound is not only effective against ordinary mites, but also against resistant mites, and is accordingly highly valuable when applied alone or in conjunction with other insecticidal and pesticidal compounds or compositions.

Para-chloroazoxybenzene may be represented by the structural formula:

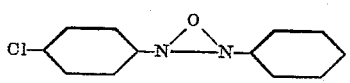

although some authorities represent the oxygen as bounded to only one of the nitrogen atoms, which is thus pentavalent, leaving the other nitrogen atom trivalent. This compound is of very limited solubility in water, and soluble in certain organic solvents to a greater or lesser extent, including chlorobenzene, ortho and para-dichlorobenzene, nitrobenzene, benzene, xylene, toluene, cyclohexanone, and the like. This compound is known in the prior art and may be made by known methods, and accordingly, no claim is made thereto per se. A suitable method for its preparation is disclosed in an article by V. O. Lukaschevich in Compte. Rend. Acad. Sci. U.S.R.R. 21, 376–9 (1938) (C.A. 33, 37694). This article discloses that para-chloroazoxybenzene may be formed by the action of nitrosobenzene on N-(para-chlorobenzene) hydroxylamine.

The essential miticide compound of the instant invention may be applied to the mite to be killed directly, or indirectly, as by application to the vegetation upon which it appears and feeds, thereby acting in a residual capacity. The pesticidal compositions of the instant invention are prepared by formulating the para-chloroazoxybenzene with a carrier which may be solid, as for example, in dust application, or liquid, for example as a suspension or dispersion in water, as an oil-in-water type emulsion or as a solution in an organic solvent. Desirably, the compositions should contain a surface-active agent which may be a dispersing agent or a wetting agent, or a combination thereof.

In the formulation of powders for application as dusts, the para-chloroazoxybenzene is admixed with a free-flowing particulate dry inert carrier which may be organic or inorganic. Examples of such solid carriers include sawdust, the flours derived from soy bean, peach pit, apricot pit, tobacco, walnut shell, wheat, wood, by-product lignin and lignocellulose, and the like. As inorganic carriers, there may be mentioned the silicas such as diatomite, pumicite, and tripolite, in addition to calcium lime, magnesium lime, carbonates such as calcite and dolomite, silicates such as mica, talc, pyrophillite and the various clays such as montmorillonite, saponite, kaolinite, attapulgite and the like.

For dusting purposes, the formulations may generally contain from about 5 to 80% by weight of para-chloroazoxybenzene and the balance solid carrier with desirably from about 0.5 to 2% of a wetting agent or dispersing agent or both. The addition of such agents renders the dust wettable, thereby facilitating the application thereof from an aqueous slurry in the field if desired. In formulating the above described dust or powder compositions, the particles should preferably have a particle size ranging from about 0.5 to 10 microns. In general, the solid carrier and active ingredient should first be thoroughly mixed as, for example, by passage through common mixing or blending devices such as ribbon blenders, ball mills and various types of grinding equipment. The intermixture is then subjected to attrition in order to provide a powder of the type suitable for subsequent application as a dust or in spray compositions or the like. This attrition which, if desired, is capable of producing average particle sizes of as low as 0.5 micron, may be suitably obtained by use of the fluid energy type grinding means known as air attrition mills or jet pulverizers. In such pulverizing devices, the mixture of carrier and active miticide is suspended and is buffeted in a high velocity gas stream, whereby there occurs the required attrition or abrasion of the particles on each other or on the walls of the pulverizing equipment. Air attrition mills which are suitable for use in preparing these formulations are described in, for example, United States Nos. 2,032,827, 2,219,011 and 2,284,746. Hammer mills may also be employed. Care should be taken to cool the composition and/or equipment during this grinding operation to prevent melting of the para-chloroazoxybenzene. An effective expedient for this purpose involves admixing Dry Ice into the composition being subjected to attrition.

As examples of wetting agents which may be employed in the above described dust formulations, there may be mentioned broadly the anionic and non-ionic surface-active agents. Examples of these include fatty alcohol sulphates such as sodium lauryl sulphate, salts of alkyl aryl sulphonates such as sodium dodecyl benzene sulphonate, N-higher acyl taurines such as palmitoyl methyl taurine, sulphonated fatty and polycarboxylic acids such as sulphonated castor oil and dioctyl ester of sodium sulfosuccinate, in addition to ordinary soaps such as sodium oleate and sodium stearate. Examples of nonionic surface active agents include polyethylene glycol derivatives such as the condensation products of a plurality of moles (e.g. 2–20 or more) of ethylene oxide with higher aliphatic alcohols such as lauryl alcohol, alkyl phenols such as nonyl phenol or octylphenol, amines such as dodecyl amine, amides such as lauric acid amide, fatty acids such as stearic acid, and other higher organic compounds of at least 6 Catoms containing a reactive hydrogen atom, as disclosed in United States No. 1,970,578 and other patents. A specific example preferred herein is iso-octyl phenol decaethylene glycol ether.

Examples of suitable dispersing agents operative in the above formulations include calcium lignosulfonate, sodium naphthalene formaldehyde polymer sulfonate, or a water soluble salt of abietic acid (e.g. sodium abietate), or the like. The use of a wetting agent is primarily for the purpose of producing an improved protective film of the active ingredients over the plant surfaces, whereas the use of a dispersing agent is primarily for the purpose of obtaining an improved suspension of the solid particles in a liquid medium, preferably water, when it is desired to so apply the instant compositions.

As pointed out above, the carrier may also be a liquid if the active ingredient is to be applied in the form of a spray, or by brushing or impregnation. These liquid formulations may contain the para-chloroazoxybenzene therein in dilutions ranging from about 1:10 to 1:3,000 depending upon the liquid diluent, the intended use, and the like. The higher dilutions, as for example dilutions of 1:400 to 1:3000, are employed in the case of application from aqueous slurries or aqueous oil-water type emulsions. In producing the aqueous slurries or suspensions, the above described wetable powder formulations may be simply dispersed in the required amount of water in the field to produce the desired concentration necessary for spraying. In the production of oil-in-water emulsions, a concentrate of the para-chloroazoxybenzene in one of the above mentioned solvents therefor, or in acetone, may be prepared and made available for sale, or immediate use, which concentrate may preferably further contain an emulsifying agent of known type, as for example one of the above described dispersing or wetting agents or the like. Such concentrations may then readily be emulsified in the required amount of water for application in the field.

If desired, the above described solutions of parachloroazoxybenzene in organic solvent solution may be applied as such, in more or less concentrated form, to the mite, as for example in a small hand sprayer. In such cases, higher concentrations of the order of 1:10 dilution to 1:100 may be employed. If desired, such organic solvent formulation may be prepared in the form of an aerosol in which the active miticide is dispersed in a liquid capable of expanding rapidly to atomize the composition. Such a composition may contain up to 5% of the active miticide, up to 10% of acetone or cyclohexanone which acts as a coupling agent or mutual solvent, up to 10% of an oil such as mineral oil or vegetable oil, which serves to regulate the particle size, if desired, and the remainder a solvent capable of expanding rapidly at ordinary temperatures to form a gas, as for example dichlorodifluoro methane (Freon) or methyl chloride.

It will be understood that the para-chloroazoxybenzene miticide of the instant invention may be applied in 100% form as a dust, but this is of course highly uneconomical and it should, for all practical purposes, be formulated in accordance with the above. It will also be understood that these formulations may contain other pesticides, as for example, insecticides, fungicides, and the like. When applied in combination with DDT, a highly cooperative result is obtained in killing all types of insects and other pests which attack vegetation, as pointed out above. Other usual assistants may be included in these formulations, such as bonding agents, spreading agents, sticking agents, extenders and the like. The miticide compositions of the instant invention act both directly and in a residual capacity, maintaining their miticidal activity for extended periods of time on the vegetation subject to attack by mites and others insects.

The following examples, in which parts are by weight unless otherwise indicated, are illustrative of the instant invention and are not to be regarded as limitative.

*Example 1.*—An 0.5 gram sample of para-chloroazoxybenzene is dissolved in excess acetone and the resulting solution ground into a 10 gram portion of Attaclay carrier in finely divided form. After a uniform mixture is obtained, the acetone is evaporated and the resulting mixture further ground to a particle size of about 5 microns. The resulting dust may be used for application as a miticide as such, but in the preferred embodiment, there is then admixed uniformly into this dust 1% by weight of Triton X–100 (iso-octyl phenol decaethylene glycol ether). The resulting wettable powder is readily slurried in water in the desired concentrations in the field to produce a highly effective miticidal composition.

In standard tests against red mites, the above wettable powder, when applied from an aqueous spray at an active ingredient dilution of 1:500 gave 100% kill after 72 hours against both resistant mites and normal mites. At a dilution of 1:2,000 a kill of 89% was obtained against resistant mites and 83% against normal mites after 72 hours. In a similar test, at a dilution of 1:500, a 100% kill was obtained against both resistant mites and normal mites after 12 days.

In formulating the aqueous sprays containing the above wettable powder, in some cases an addition of acetone or similar solvent for the para-chloroazoxybenezene acts as a mutual solvent to promote dispersion in the spray formulations.

*Example 2.*—When the procedure of Example 1 is repeated, but employing Vatsol O.T. (dioctyl ester of sodium sulfosuccinate) instead of the Triton X–100, similar results are obtained. If desired, the Vatsol O.T. and the Triton X–100 may be employed together in the formulations. Further, in both this example and in Example 1, the attapulgite clay may be replaced by Hi-Sil (silica) or similar carrier such as kaolin and the like.

*Example 3.*—When the procedures of Examples 1 and 2 are repeated but with the further addition of 1% of calcium lignin sulfonate, further improved results are obtained with respect to facility of dispersion, spreading on the vegetation and mites, and sticking thereto are obtained. If desired, the Triton X–100 and Vatsol O.T. of Examples 1 and 2 may be entirely replaced by calcium lignin sulfonate, and in fact, higher proportions up to 25% of the calcium lignin sulfonate may be employed in some cases.

*Example 4.*—25 parts of para-chloroazoxybenzene, 5 parts of Triton X–100 and 70 parts of chlorobenzene, dichlorobenzene, xylene, benzene or toluene are combined to give a liquid concentrate which may be employed as such as a spray or which may be readily dispersed with stirring in water at the desired dilution to provide a highly effective aqueous spray. The organic solvent spray and the aqueous spray are highly effective miticidal compositions.

*Example 5.*—A wettable powder of highly concentrated activity may be made by grinding together 25 parts of para-chloroazoxybenzene, 60 parts of kaolin, 10 parts of magnesium carbonate, 3 parts of partially desulfonated lignin, and 2 parts of Triton X–100. This powder is readily diluted with water for the production of a miticidal aqueous spray.

*Example 6.*—A 10% solution of para-chloroazoxybenzene in chlorobenzene, dichlorobenzene or benzene may be prepared which may be employed as a home garden spray. If desired, a wetting agent may be added such as Triton X-100 or Vatsol O.T.

*Example 7.*—One part of para-chloroazoxybenzene is dissolved in 5 to 10 parts of mineral oil and 94 to 89 parts of petroleum (B.P. 180–220° C.) to produce a spray with highly effective activity against red mites.

*Example 8.*—A uniform homogeneous powder is prepared containing para-chloroazoxybenzene and calcium lignosulfonate in proportions of 1:1. This formulation is readily dispersible in water to produce a highly effective aqueous miticide.

This invention has been disclosed with respect to certain preferred embodiments, and various modifications and variations thereof will become obvious to the worker skilled in the art. It is to be understood that such modifications and variations are to be included within the spirit and scope of this invention.

What I claim is:

1. A miticidal composition comprising para-chloroazoxybenzene, a carrier therefor, and a surface active adjuvant selected from the group consisting of dispersing agents and wetting agents.

2. A miticidal composition in dry particulate form comprising para-chloroazoxybenzene, a solid carrier therefor, and a surface-active adjuvant selected from the group consisting of dispersing agents and wetting agents.

3. A miticidal composition in liquid form comprising an oil-in-water emulsion in which the dispersed phase comprises a solution of para-chloroazoxybenzene in an organic solvent therefor.

4. A miticidal composition in liquid form comprising para-chloroazoxybenzene dispersed in water with the aid of a dispersing agent.

5. A method of destroying mites, comprising applying para-chloroazoxybenzene thereto.

6. A method of destroying mites, comprising applying thereto a composition as defined in claim 1.

7. A method of destroying mites, comprising applying thereto a composition as defined in claim 2.

8. A method of destroying mites, comprising applying thereto a composition as defined in claim 3.

9. A method of destroying mites, comprising applying thereto a composition as defined in claim 4.

References Cited in the file of this patent

King: Chemls. Evaluated as Insecticides, USDA Handbook No. 69, May 1954, p. 56.

Frear: A Catalogue of Insecticides and Fungicides, 1948, Chronica Botanica Co., vol. 1, p. 26.

Frear: Chem. of Insecticides, Fungicides and Herbicides, 1948, 2nd ed., pp. 280–287.

Chem. Abst. 33, 3769 (4), 1939.